(12) United States Patent
Duparre et al.

(10) Patent No.: US 8,432,625 B2
(45) Date of Patent: Apr. 30, 2013

(54) LENS AND METHOD FOR MANUFACTURING SAME

(75) Inventors: Jacques Duparre, Jena (DE); Frank Wippermann, Meiningen (DE); Peter Dannberg, Jena (DE); Andreas Braeuer, Schloeben (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 0 days.

(21) Appl. No.: 13/267,015

(22) Filed: Oct. 6, 2011

(65) Prior Publication Data
US 2012/0081801 A1   Apr. 5, 2012

Related U.S. Application Data

(63) Continuation of application No. PCT/EP2009/003928, filed on Jun. 2, 2009.

(51) Int. Cl.
G02B 7/02 (2006.01)
G02B 27/10 (2006.01)
G03B 21/60 (2006.01)

(52) U.S. Cl.
USPC ............... 359/811; 359/455; 359/619

(58) Field of Classification Search .......... 359/618–621, 359/625–626, 443, 454–455, 821–823, 665–667, 359/459, 450; 264/1.1, 1.32, 2.7
See application file for complete search history.

(56) References Cited

U.S. PATENT DOCUMENTS

| 4,154,506 A | 5/1979 | Yevick |
| 2002/0027715 A1* | 3/2002 | Shimizu et al. ............. 359/619 |
| 2005/0061950 A1 | 3/2005 | Jiang et al. |
| 2008/0290435 A1 | 11/2008 | Oliver et al. |

FOREIGN PATENT DOCUMENTS

JP    2006323149 A  * 11/2006

OTHER PUBLICATIONS

Official Communication issued in International Patent Application No. PCT/EP2009/003928, mailed on Mar. 2, 2010.
Duparre et al., "Lens and methods for manufacturing same," U.S. Appl. No. 13/267,021, filed Oct. 6, 2011.

* cited by examiner

*Primary Examiner* — Dawayne A Pinkney
(74) *Attorney, Agent, or Firm* — Keating & Bennett, LLP (57) ABSTRACT

In a method for manufacturing a lens, a substrate is provided which includes recess in a first surface thereof. A lens structure having a first desired lens surface and a second desired lens surface is formed in the substrate's recess.

18 Claims, 11 Drawing Sheets

LENS AND METHOD FOR MANUFACTURING SAME

CROSS-REFERENCE TO RELATED APPLICATIONS

This application is a continuation of copending International Application PCT/EP2009/003928, filed Jun. 2, 2009, which is incorporated herein by reference in its entirety.

BACKGROUND OF THE INVENTION

Embodiments of the invention concern the field of optical systems, more specifically the field of lenses and manufacturing such lenses. Embodiments of the invention relate to wafer scale optics, more specifically to wafer scale lens designs that may be used in lens arrangements or optical systems, e.g. in digital cameras in mobile phones, personal digital assistants and the like, especially in combination with CMOS image sensors.

In the field of wafer scale optics lenses are manufactured by providing a UV curable polymer material onto a thick glass substrate and shaping the polymer material into a desired lens form. The polymer may be deposited either on one side or on both sides of the glass substrate. A plurality of such lens wafers are stacked on each other, either directly or by means of one or more spacer wafers which may be glass or polymer substrates comprising holes. Thus, the respective lenses are arranged with a distance to the imaging plane. Then, the wafer is diced and the respective optics are mounted to an imaging sensor.

This approach is disadvantageous as for mechanical and structural reasons the amount of high refractive index material, i.e. materials having a refractive index n of about 1.5 vs. n=1 of air, (e.g. the substrates which form parallel plates) within the imaging beam path is higher as it is desired by the optical design. This reduces the image quality and necessitates more lenses and/or lenses having a more complicated shape within the stack to compensate for the reduced image quality. Thus, the adaptation of "classic" lens designs and the use of the design rules which apply for these classic lens designs which avoid the occurrence of specific imaging errors cannot be used in the design of such wafer scale lenses.

The just mentioned wafer scale optics and sandwiches thereof may be used in digital cameras and, by their nature, incorporate substrates (wafers). From the manufacturing perspective it is actually advantageous that these substrates are comparatively thick compared to the (UV-polymer replicated) lenses which are formed on top of the substrate or on both sides of the substrate. However, this is contradiction to lens arrangements observed in classical objective designs where for example arrangements of one or several thin but strongly bent meniscuses are applied in order to reduce aberrations and especially to obtain a small astigmatism. This is a drawback of state-of-the-art wafer scale lens designs as due to the evident problem of astigmatism in these designs their optical performance is poor although much more complex (highly aspheric) lens shapes are applied. The problem of thick substrates is especially evident for the above mentioned meniscus lenses, which is the lens that has lens surfaces which are curved into the same direction. As mentioned above, in conventional optical systems a strong curvature of the meniscus is desired, however, applying this design rule to wafer scale optics will necessitate the provision of a glass substrate between the opposing lens areas. In view of the strong curvature of the opposing surfaces of the meniscus a high thickness is necessitated so that the lens will lose its optical advantages.

An alternative approach for manufacturing lenses on a wafer scale is to emboss the complete lens wafer from a polymer material which allows lenses to be generated which are very thin. However, this approach is disadvantageous, as the wafer itself is not a stable support device (e.g. a stable glass support). This instable support will result in inhomogeneities regarding the thickness and the bending of the wafer. Also shrinkage of the wafer is observed resulting in a lateral uncertainty. These effects can be severe such that a plurality of wafers or plates cannot be stacked on top of each other.

Another approach known in the art for manufacturing lenses is the injection molding of lenses. However, the procedural overhead for generating lenses using injection molding in terms of machinery and in terms of process steps is disadvantageous. Further, no manufacturing on a wafer scale is possible.

SUMMARY

According to an embodiment, a method for manufacturing a lens may have the steps of: (a) providing a substrate comprising a recess in a first surface of the substrate; and (b) forming in or above the recess of the substrate a lens structure having a first desired lens surface and a second desired lens surface.

According to another embodiment, a lens may have: a substrate having a recess in a first surface thereof; and a lens structure arranged in the recess.

According to another embodiment, an optical system my have one or more of the inventive lenses.

Further, the invention provides an optical system comprising one or more of the inventive lenses wherein in case of providing a plurality of stacked lenses and dependent from a desired optical characteristic of the optical system, the lens surfaces and the substrate thickness of each of the plurality of lenses are selected accordingly.

To overcome the problems outlined above with regard to the conventional wafer scale technology which necessitates the use of substrates to which the UV-polymer replicated lenses are applied the inventive approach avoids the provision of unnecessary material, e.g. glass, in the optical path.

In accordance with embodiments of the invention, lenses are manufactured inside one or more recesses or through holes in a substrate, e.g. a glass substrate. The conventional approach of directly forming the lenses on the surface(s) of a glass substrate is no longer pursued. The advantage of the inventive approach is that no "thick" glass is in the optical path. Thus, the lens thickness is substantially determined by the optic design which allows the use of much more advantageous lens shapes. Since the glass substrate outside the cavity of the imaging beam path is still maintained, also the overall mechanical stability of the arrangement is ensured.

Thus, when compared to conventional approaches the inventive approach is advantageous from an optical design perspective. The substrate thickness otherwise introduces astigmatism into a convergent bundle so that in conventional wafer scale lens optical designs this had to be corrected by more elements and/or more complex lens shapes. Alternatively, one had to live with the poor optical performance. The substrate thickness increases TTL (TTL=total track length) since this means more than necessitated "high index material" in the optical path. The high index material, i.e. the material having a high refraction coefficient "n" (n about 1.5), increases the track to n*f (assuming 100% filling of the optical path with small n). Thus, the less the filling in the optical path is the less is the increase of thickness. In order to reduce TTL even with a thick substrate conventionally rays are bend outwards in front of the lens and bend back towards the optical axis close to the image sensor to reduce CRA (CRA=chief ray angle). This results in high refractive power of the lenses, which is actually not needed but results in strong aberrations, which again have to be corrected by complex lens shapes, however, this results in unnecessary tight tolerances.

In classic lens design menisci are typically the elements of choice, and the lens thickness is tried to be determined by the optical needs and not by mechanical/process constraints. The reduction of the number of geometrical constraints such as substrate thickness or residual replication layer thickness generally simplifies lens design since the degrees of freedom are increased. Optics are the better or uncritical with respect to tolerance the less ray bending happens when the light bundles propagate through the lens. Therefore, it is intended that the light beams hit lens surfaces as perpendicular as possible which, in turn, needs strongly bent lens surfaces. In case substrates are necessitated in between these surface that means that the center thickness of the lens will be very high with the above mentioned problems as consequence.

Applying the inventive approach avoids the need to provide substrates in the optical path. In accordance with the inventive design only the lens structure itself or only the optically necessitated part of the lens structure is within the optic path thereby avoiding the just mentioned problems.

In accordance with a first aspect of the invention the recess extends from the first surface of the substrate to a second surface of the substrate, thereby defining a hole through the substrate. The lens structure is formed by providing a top mold having a shape in accordance with a first desired lens surface, providing a bottom mold having a shape in accordance with a second desired lens surface, introducing a lens material into the recess of the substrate, and introducing the top mold and the bottom mold into the recess to shape the lens material in accordance with the desired lens surfaces. The lower mold is provided first and the lens material is filled into the recess the lower end of which is closed by the lower mold. Then the "complete" mold is closed by introducing the upper mold into the filled recess. The lens material is then cured by UV illumination.

In accordance with this aspect the lens structure is formed from both sides of the cavity or the recess. In accordance with an embodiment, this aspect may be repeated to obtain a multi-layered lens structure formed of a plurality of lens materials, wherein these lens materials may have different dispersion characteristics. In accordance with another embodiment, a sacrificial material may be applied to the lens structure and a further, permanent lens material is applied to the sacrificial material so that after removing or dissolving the sacrificial material a gap between the two lens layers is obtained. This gap may be filled by air or any other suitable materials, like polymers of much smaller refractive index, water, argon, N2, immersion oils.

The material in the gap is selected dependent from the desired characteristic of the entire lens structure provided within the spacer cavity.

In accordance with another embodiment so-called "catch grooves" are provided in the substrate and more specifically, in the sidewalls of the recess, wherein the catch grooves are provided to receive excess lens material during shaping thereof by means of the top and bottom molds or stamps. In addition, this embodiment is advantageous as at the same time the lens structure is secured within the cavity by that portion of lens material which was displaced during the shaping process in the grooves.

In accordance with a second aspect of the invention the lens structure within the substrate's recess is formed by providing a sacrificial material having a shape in accordance with a first desired lens surface, applying the lens material to the sacrificial material to define the lens structure, mounting the structure comprising the sacrificial material and the lens material to the substrate such that the lens structure is arranged in the recess, and removing the sacrificial material.

In accordance with this aspect, the negative shape of the first side of the lens is formed in the sacrificial material which is provided on a temporary support. Then, the second side of the lens is formed in a stable lens material which is provided on the sacrificial material. The second lens side is then transferred to the spacer substrate or spacer wafer and bonded to it. Following this transfer the sacrificial material is dissolved or removed together with the temporary support. Again, it is possible to provide a plurality of different lens materials of different dispersion characteristics. Also, it is possible to provide on the first lens portion an additional sacrificial material and to form the further lens structure on top of the sacrificial material so that following the removal thereof, a gap, advantageously an air-filled gap, is provided between the two lens portions.

In accordance with further embodiments of the invention, aperture structures are provided. While in conventional approaches such aperture structures were provided on the glass substrate underlying the lens structure, this is no longer possible in accordance with the teachings of the invention as for the reasons outlined above, the lens is mounted within the cavity or recess, thereby avoiding undesired effects due to the additional glass material provided by the glass layer in conventional approaches. Therefore, in accordance with the invention the aperture structures may be provided on the lens structure itself, for example by a photolithographic process or by a lift-off process. Additionally, it might be desired to provide further non-transparent spacer wafers having a defined aperture and providing at the wafer having the cavity in which the lens structure is arranged. Alternatively, very thin glass wafers or polymer sheets having aperture structures may be provided, wherein these aperture structures are generated by lithographic processes. The thickness of the glass wafer or polymer sheet in such an embodiment may be 0.01-1 times the thickness of the substrate or may be in the range of 10 μm to 1000 μm (or two laminated/bonded half-thickness glass/polymer plates with apertures in between) to avoid undesired distortions by this additional glass element.

In accordance with further embodiments, the process is done on a wafer scale, i.e. the support is formed by a wafer having a plurality of recesses. This wafer is of a hard organic or inorganic material like glass, ceramic, glass ceramic, semiconductor material like silicon or germanium, plaster and polymer, respectively, and other epoxy materials as they are for example used for molding components, like integrated circuit devices or circuit chips. The opposing main surfaces of the wafer are both plain and parallel and the material is non-transparent.

An advantage of the inventive approach is that it is now possible to manufacture wafer scale lenses with a design which does no longer have to take into consideration the glass substrate thickness. One further advantage is that by avoiding the optical unnecessary glass substrate (=parallel plates) within the convergent beam path the aberration astigmatism is reduced or completely avoided. Thus, it is no longer necessitated to correct possible image errors by additional measures and/or lenses having a complicated design. This results in a more simple design and reduces costs for the optical system.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
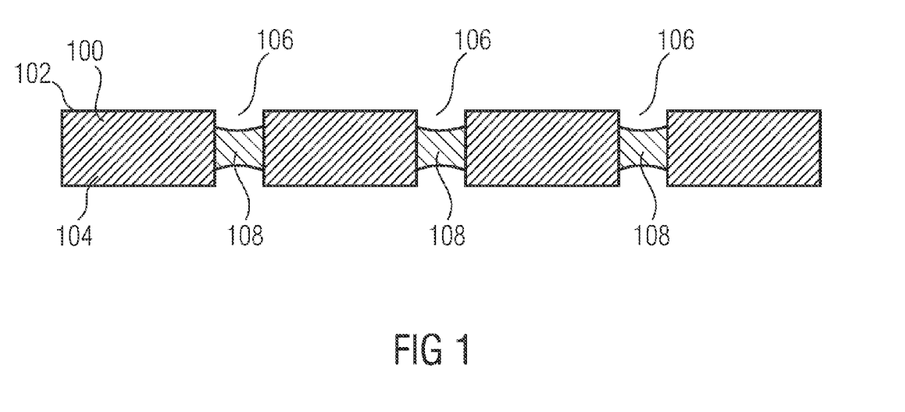
FIG. 1 shows an array of lenses according to an embodiment of the invention.

FIG. 1 illustrates an array of lenses in accordance with an embodiment of the invention. The lens array comprises a substrate or wafer 100 comprising two opposed main surfaces 102 and 104. The wafer 100 comprises a plurality of recesses 106 extending from the first surface 102 to the second surface 104 of the wafer 100, thereby defining a hole or opening through the wafer 100, also termed as cavity or spacer cavity. Within each recess or cavity 106 a lens structure 108 is arranged having the desired lens surfaces, in the embodiment shown in FIG. 1 a bi-concave lens. Alternatively, the lens structure 108 might have any desired type, e.g. a bi-convex lens, a plano-concave lens, a plano-convex lens or a meniscus. The lens structure 108 is formed of lens material and dependent from the desired characteristics the lens structure 108 may be formed by one or more layers of lens material. In case of using a plurality of layers of lens material dependent from the desired optical characteristics again, the lens material is either the same for one or more or all layers or may be different for some or all of the layers or it may be even air in between them. In accordance with the invention the lenses formed by the lens structures 108 are directly "replicated" in the cavity 106 of the substrate 100. The lens structure 108 is formed of a polymer material which may be provided by a dispenser allowing introducing the material into the cavities only. Alternatively the lens material may be applied onto the entire substrate 100. The polymer material is then cured, for example by illumination with ultraviolet light, possibly in a structured manner so that only the material within the cavity 106 is cured and the remaining material may be dissolved and removed. This avoids the presence of a thin residual layer of polymer material on the entire wafer structure which in some cases might be undesired. In accordance with one embodiment of the invention the lens structures 108 shown in FIG. 1 are formed by respective molds or stamp tools which are provided such that the lens shaping portion thereof can be introduced deep into the cavity. The lens material is a polymer material filled with nano particles which avoids shrinkage. The lens material bonds, glues, sticks or attaches to the hole-sidewalls. In embodiments of the invention the surface of the sidewalls of the recess may be treated in advance to the replication step to improve the bonding force. This treatment may include chemical (solvents, acids), physical (plasma) or adhesion promoters ("prime") such as "silanizing".

Figure 2:
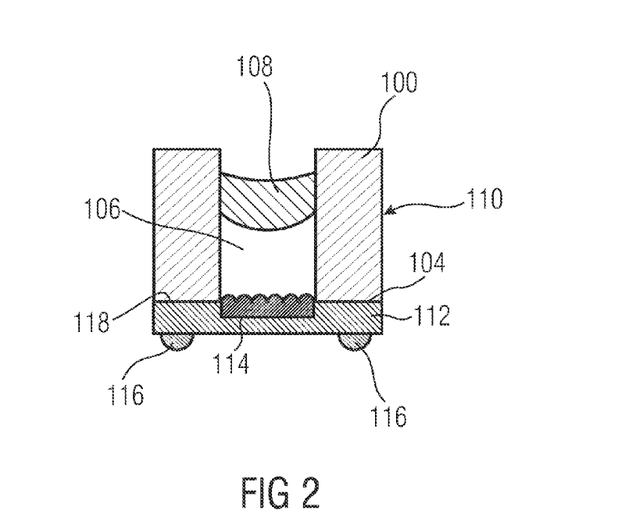
FIG. 2 shows an optical system according to an embodiment of the invention.

FIG. 2 shows an optical system according to an embodiment of the invention. The system shown in FIG. 2 comprises a lens 110 mounted to a chip 112 which includes circuitry, like image processing circuitry or the like and also photosensitive or light-emitting areas 114. In one embodiment the optical system may comprise a CMOS pixel matrix and the fill factor enhancing microlens array on top of image sensor as is shown in FIG. 2. By means of contact bumps 116 the optical system shown in FIG. 2 can be surface mounted and contacted to a support, like a printed circuit board. The lens 110 comprising the lens structure 108 having a meniscus shape is provided in the cavity 106 formed in the support or substrate 100. The substrate 100 is attached with its second surface 104 to a surface 118 of the chip 112 such that the photosensitive or light-emitting region 114 of the chip 112 is aligned with the cavity 106 and lens 108 laterally, so that the lens structure 108 is arranged at a desired distance from the area 114, thereby either allowing light generated by the chip 112 to be sent out through the lens structure 108 or to focus light from the outside onto a photosensitive region of the chip 112 through the lens structure 108. FIG. 2 shows an extreme case of a freestanding wafer scale meniscus in the cavity or through-hole 106 of the substrate 100. The lens is attached only to the spacer wafer or substrate, thereby avoiding the need to provide a glass substrate as is necessitated in conventional approaches.

Subsequently, embodiments for manufacturing the lenses shown in FIGS. 1 and 2 are described in further detail.

Figure 3A:
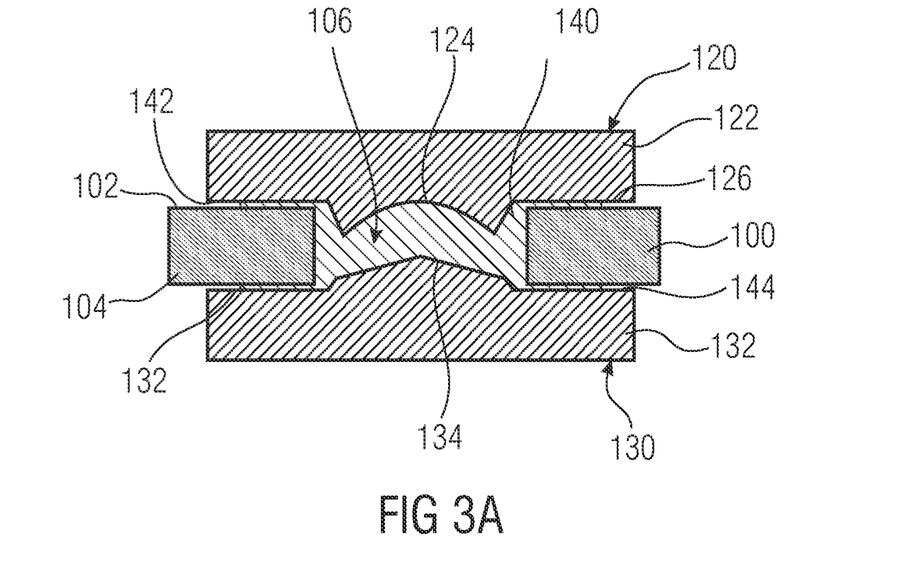
FIGS. 3(a)-(b) show the manufacturing of a lens according to an embodiment of the invention.

FIG. 3 illustrates an embodiment for manufacturing a lens in accordance with which a top mould or stamp 120 is provided which comprises a support portion 122 and a mold or stamp portion 124. The mold portion 124 is provided such that it extends from a first or lower surface 126 of the support portion 122 further downward as is illustrated in FIG. 3(a). The mold portion 124 of the top mold 120 has a structure in accordance with an upper desired lens surface of the lens structure to be manufactured. The lens portion 124 of the top mold 120 defines an upper side or upper surface of the lens structure. The mold portion 124 defines the negative shape of an upper convex portion of the lens structure to be formed. Further, a lower mold or stamp 130 is provided which is structured in a similar manner as the top mold 120. The bottom mold 130 comprises a support portion 132 and a mold or stamp portion 134 extending from a surface 136 of the support portion 132 upwards. Like the mold portion 124 of the top mold 120 also the mold portion 134 of the bottom mold 130 has a shape which is selected in accordance with a lower desired lens surface of the lens structure to be manufactured. In the embodiment of FIG. 3 the mold portion 134 of the lower mold has a negative shape to define a concave lower surface of the lens structure to be manufactured. The mold portions 124 and 134 of the two molds or stamps 120 and 130 are arranged to extend from the respective surfaces 126, 136 of the mold support portions 122 and 132 to allow the respective mold portions to intrude into the cavity or recess 106 of the substrate 100, e.g. a glass substrate, to allow forming of the lens structure within the recess or cavity in a manner as shown in FIG. 1 or 2.

For manufacturing the lens structure a lens material, for example, a UV-curable polymer material 140 is applied such that at least the cavity or hole 106 within the support or substrate 100 is filled (the hole is at least partly filled but at the full diameter). Then, the molds 120 and 130 are arranged with respect to the substrate 100 such that the respective mold portions 124 and 134 are aligned with each other and with the recess 106 and the molds are moved to introduce the mold portion 124 and 134 into the recess 106 in a manner as shown in FIG. 3(*a*), thereby defining a desired shape of the lens material 140. The molds 120 and 130 are arranged with regard to the substrate 100 such that when defining the final structure of the lens to be manufactured, the molds 120 and 130 are provided with a space 142 and 144 from the respective surfaces 102 and 104 of the substrate 100. This space is provided to allow excessive lens material 104 to be displaced from the recess 106.

Advantageously, the mold portion 134 of the lower mold 130 is introduced into the cavity 106 first and then the lens material 140 is filled into the recess 106 the lower end of which is now closed by the lower mold. Then the "complete" mold is closed by introducing the mold portion 124 of the upper mold into the filled recess 106. The lens material 140 is then cured by UV illumination. At least one of the molds is transparent for the UV illumination to allow curing of the lens material. In case of a thermal curing of the lens material, the mold(s) need not to be transparent.

Figure 3B:
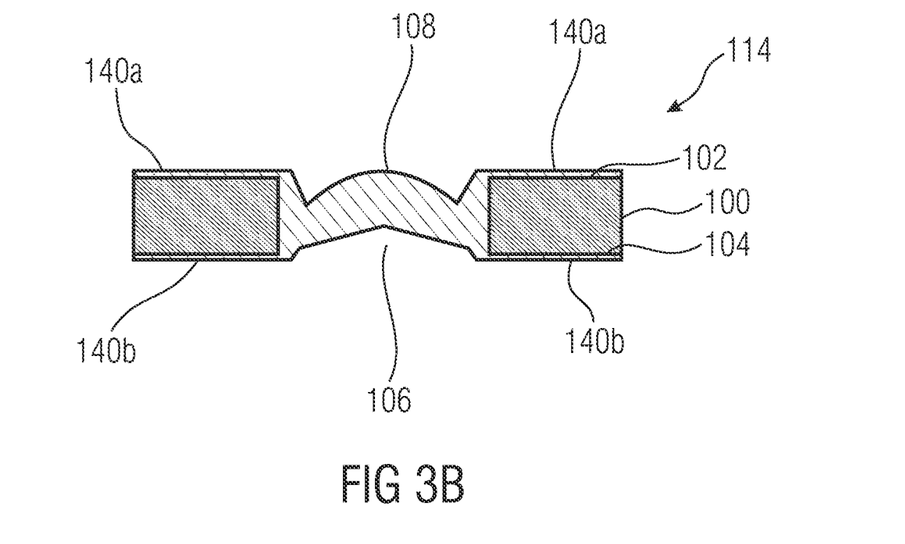

Following UV or thermal curing of the lens material and removal of the molds 120 and 130 yields the final lens structure as it is shown in FIG. 3(*b*).

The lens 114 comprises the substrate 100 and the lens structure 108 arranged in the recess 106 without any additional glass support elements for the lens structure 108 in the optical path, thereby avoiding the problem associated with conventional approaches. As can be seen from FIG. 3(*b*) on the upper and lower surfaces 102 and 104 of the wafer or substrate 100 residual lens material layers 140*a* and 140*b* remain. These residual layers may be used for securing the lens structure 108 within the cavity 106. In case the lens structure 108 is secured within the cavity 106 by different means (see above description of FIG. 1), the residual layers 140*a* and 140*b* may be removed. Removal of these layers may be done mechanically, for example by polishing the respective surfaces 102 and 104 of the substrate 100. Alternatively, the portions of the lens material on the upper and lower surfaces 102 and 104 of the substrate 100 may be masked during the curing process so that only the material inside the cavity 106 is cured. The remaining, uncured material, namely the residual layers 140*a* and 140*b* can then be removed, for example by introducing the structure into a suitable solvent. Masking can be done, for example, by providing respective areas in the stamp or mold support portions 122 and 132, namely those portions opposing the upper and lower surfaces of the substrate 100. These masking portions are provided to block the curing energy like ultraviolet light, thereby enabling later dissolving of the residual layers.

Figure 4A:
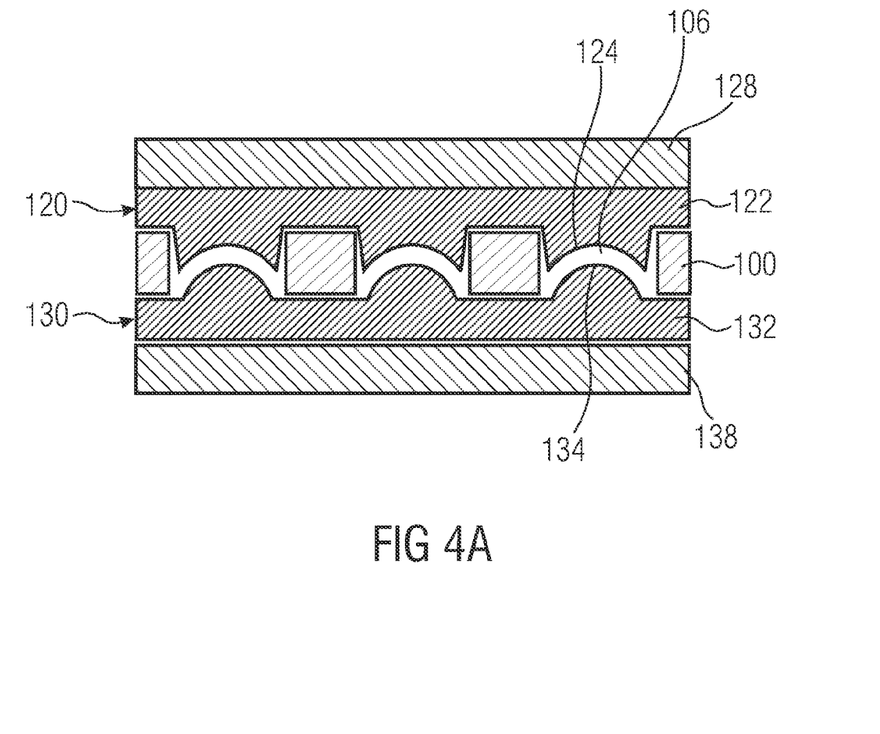
FIGS. 4(a)-(b) show the manufacturing of a lens array according to an embodiment of the invention.
Figure 4B:
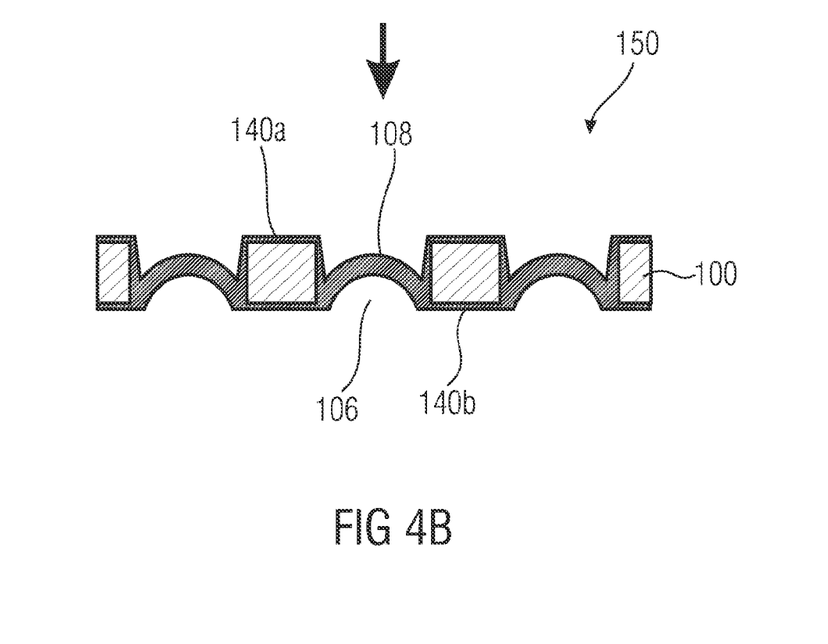

FIG. 4 illustrates an embodiment for manufacturing lenses in wafer scale. The approach described in FIG. 4 is quite similar to the one in FIG. 3 except that it is done on a wafer scale to generate an array of lenses. As is shown in FIG. 4(*a*) in accordance with this embodiment the upper mold 120 comprises a support wafer 128 on which the support portion 122 is arranged. The top mold 120 comprises a plurality of mold portions 124 defining a desired shape of an upper surface of a lens structure. In a similar manner, the bottom mold 130 comprises a support wafer 138 carrying the support portion 132 which, like the top mold, has a plurality of mold portions 134 having a desired shape dependent from the lower lens surfaces to be generated. The substrate 100 is a wafer, which might be termed a spacer wafer, which is formed of glass or ceramic or glass-ceramic, or casted, particle filled polymer having a plurality of through-holes or recesses 106. For manufacturing the lens array, a lens material is applied to the wafer 100 and advantageously only into the through-holes 106. The upper and lower molds 120 and 130 are arranged such that the respective mold portions 124 and 134 are aligned with each other and are aligned with the respective openings 106 laterally (="centered") and when later introduced into the cavities have the right axial distance and protrusion into 106. The mold portions are then introduced into the cavities 106, thereby shaping the lens material into a desired shape, in the embodiment of FIG. 4 into a meniscus lens. The lower mold is introduced into the cavities, the lens material is applied and then the second mold is introduced. The lens material is then cured. For obtaining the final desired shape of the lens material the molds 120 and 130 may be arranged with an optional distance from the upper and lower surfaces of the wafer 100, thereby allowing displaced lens material to escape from the cavities 106. Following curing of the polymer material and removal of the mold 120 and 130 yields the lens array 150 shown in FIG. 4(*b*). The lens array comprises a plurality of lens structures 108 formed in the respective cavities 106 and, like in FIG. 3, the optional residual lens materials on the upper and lower surfaces of the spacer 100 are shown at 140*a* and at 140*b*. In a manner already discussed above these residual layers may be removed entirely or partly from the upper surface of the substrate.

Thus, in accordance with an embodiment of the invention, the shaping tools in the form of the molds or stamps 120 and 130 are provided from both sides, namely from both surfaces 102 and 104 of the spacer 100. Prior to introducing the tools into the cavities, same were filled with a lens material, advantageously a lens material which can be cured by ultraviolet radiation. Alternatively, the lower molds are introduced into the cavities, the lens material is filled in and the upper mold is introduced. In accordance with an embodiment, the lens materials is applied only in the cavities, for example by providing a droplet dispenser, for example using an inkjet approach. The wafer 100 is positioned to align the mold portion 124 and 134 and the recess 106 with each other, however, with a distance to the surfaces 126 and 136 of the molds 120 and 134 to optionally allow displacement of the excess lens material. Thus, the wafer somehow "floats" in between the molds 120 and 130. The entire shaping can be done in a single step and there is no need to provide a sacrificial layer. The respective tools/stamps need to be adjusted to be aligned with respect to each other. The residual layer may be maintained completely or partly.

In addition, aperture structures may be provided, either by providing very thin additional substrates holding the aperture or by directly structuring the lens surfaces, for example by a photolithographic process, or by a lift-off process to allow provision of the aperture (="opening in a non-transparent surface") structure directly at the lens structure.

The recesses 106 in the wafer 100 may be formed by power blasting a glass substrate yielding a conically shaped recess. Alternatively, the recess may be formed by etching the substrate and the sidewalls may either be tilted with regard to the surfaces of the substrate 100 or may be perpendicular thereto.

Alternatively, the wafer 100 may be formed by casting a curable material into an adequate tool, e.g. a mold defining the wafer including the holes.

Figure 5A:
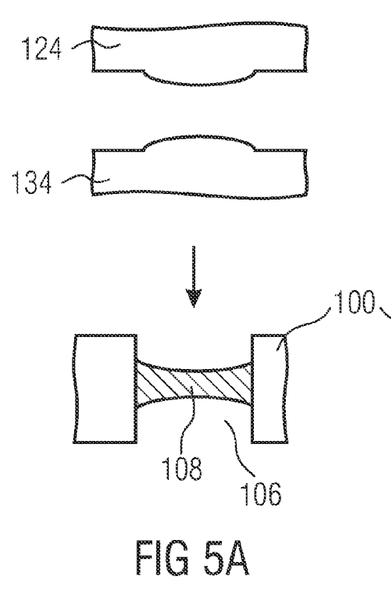
FIGS. 5(a)-(f) show different forms for the molds used in accordance with the approaches described in FIGS. 3 and 4 and the resulting lens structures.
Figure 5B:
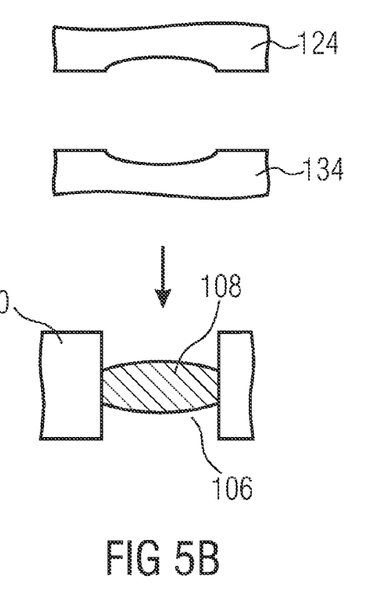
Figure 5C:
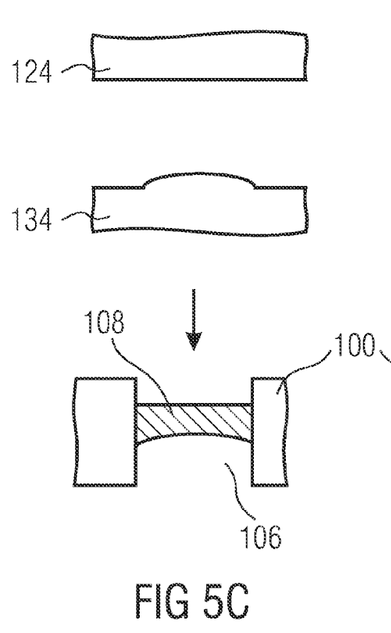
Figure 5D:
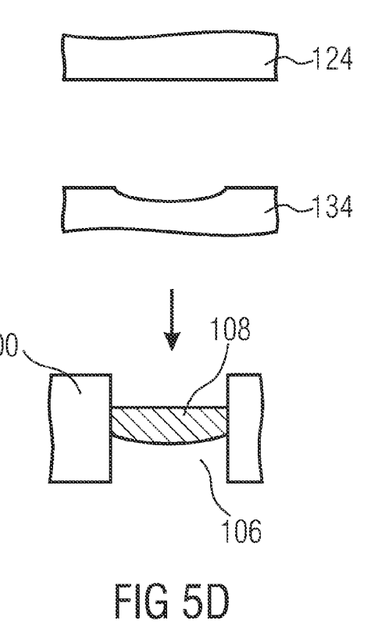
Figure 5E:
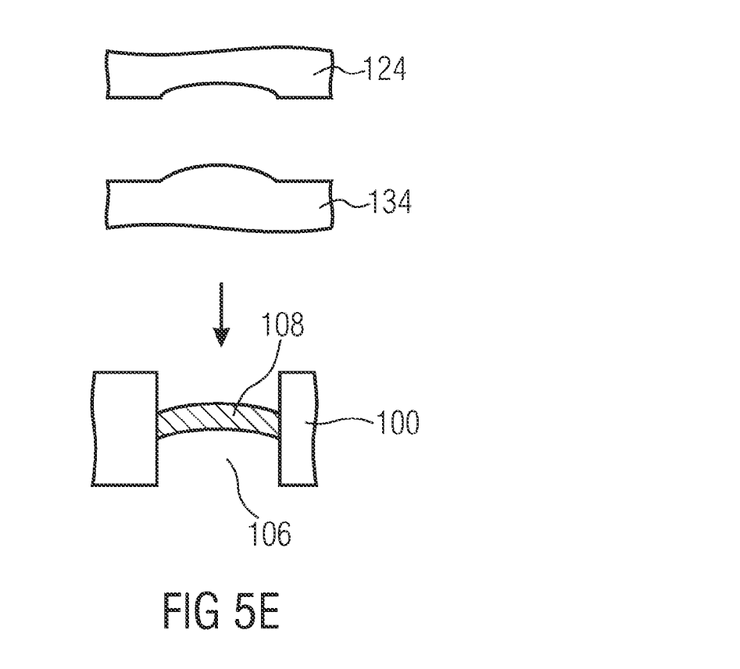
Figure 5F:
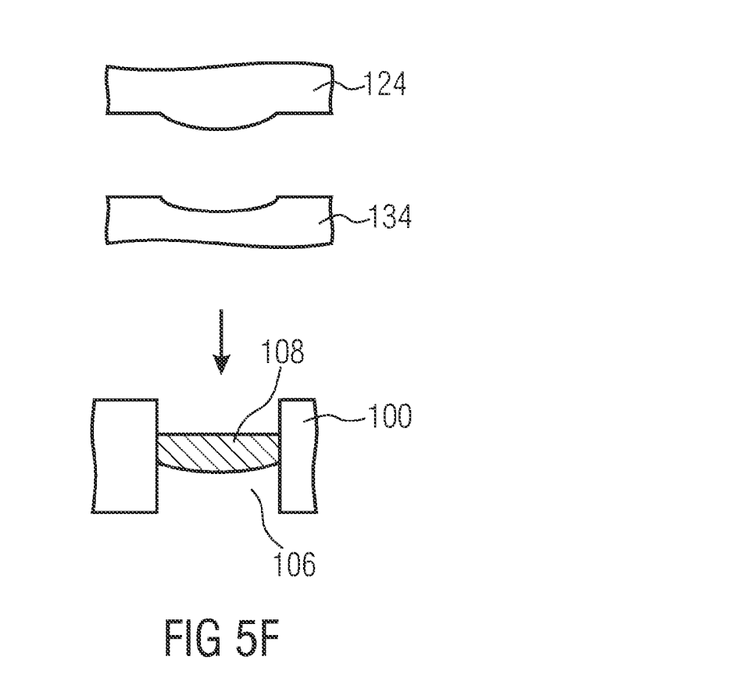

In the above described embodiment of FIGS. 3 and 4 meniscus like lenses type lenses were manufactured, however, the invention is not limited to such lenses. FIG. 5 shows various example of mold sections for the upper and lower molds and the resulting lens structures. FIG. 5 is a schematic representation of the respective mold portions. In FIG. 5(a) both the upper and lower mold portion 124 and 134 are convex-shaped, which upon introducing these mold sections into the material provided in the cavity of the spacer 100 yields a bi-concave lens structure 108 showing in the lower part of FIG. 5(a). FIG. 5(b) shows the upper and lower mold portions 124 and 134 as being concave-shaped, which upon introducing these portions into the material in the cavity yields the bi-convex lens structure 108 shown in FIG. 5(b). FIG. 5(c) shows an upper mold section having a planar surface and a lower mold section 134 having a convex shape. Introducing these two molds to the cavity and into the material applied thereto yield the plano-concave lens structure 108 shown in FIG. 5(c) in the lower part thereof. In FIG. 5(d), again, the upper mold portion 124 has a flat surface whereas the lower mold portion 134 has a concave shape. Introducing these two mold portions into the lens material filled cavity 108 yields a plano-convex lens structure 108 as shown in the lower part of FIG. 5(b). As far as FIGS. 5(c) and (d) are concerned, it is noted that as an alternative to the embodiments shown here, the respective convex and concave portion may be provided in the upper mold section 424 whereas in such a case the lower mold section 434 would be of planar shape. FIG. 5(e) shows an upper mold section having a concave surface 124 and a lower mold section 134 having a convex shape. Introducing these two molds to the cavity and into the material applied thereto yield the meniscus lens structure 108 shown in FIG. 5(e) in the lower part thereof. FIG. 5(f) shows an upper mold section having a convex surface 124 and a lower mold section 134 having a concave shape. Introducing these two molds to the cavity and into the material applied thereto yield the meniscus lens structure 108 shown in FIG. 5(e) in the lower part thereof.

Figure 6A:
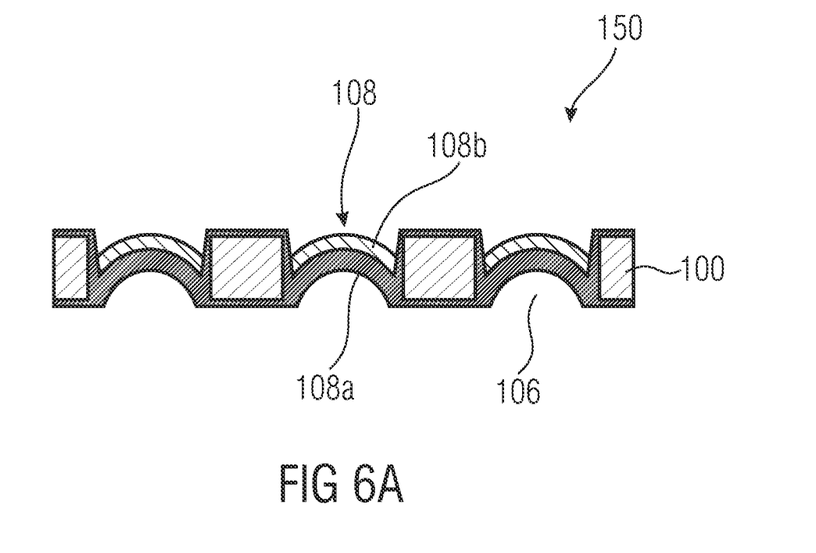
FIGS. 6(a)-(b) show further implementations of the lens arrays comprising one or more layers of lens material of the same or different characteristics with/without space therebetween which were manufactured in accordance with the teachings of the invention.

In the above described embodiments, lens arrays or lenses were manufactured from only a single layer of lens material. The invention is not limited to such lens configurations. FIG. 6 describes two further embodiments for a lens configuration which can be manufactured in accordance with the teachings of the invention. In FIG. 6(a) a lens array 150 is shown which is similar to the one shown in FIG. 4(b). However, the lens structure 108 provided in the respective cavities 106 of the wafer 100 has a two-layer configuration. To be more specific, the lens structure 108 comprises a first layer 108a of a first lens material and a second layer 108b formed on the first layer of a second lens material. Dependent from the desired optical characteristics, the material used for lens layers 108a and 108b may be the same which is advantageous for shrinkage compensation, i.e. not all material of a large lens material volume is cured at once so that a second replication compensates shrinkage of first one.

Alternatively, the materials for the lens layers 108a and 108b may be different e.g. have different dispersion characteristics, Abbe-numbers, which is advantageous to perform achromatic lenses.

The layers 108a and 108b may be formed from different materials with the same or a different thickness and/or lens surfaces. In case of different materials different refractive indices of the material are selected dependent from the desired optical characteristics, advantageously different Abbe-numbers.

The lens array 150 shown in FIG. 6(a) is manufactured by applying the lens material for the second layer 108b to the structure shown in FIG. 4(b) and by replicating the top surface of the second lens layer 108b by using an upper mold having appropriately shaped mold portions in a manner as discussed above with regard to FIG. 4(a). To provide sufficient support for the already existing layer 108a the lower mold 130 shown in FIG. 4(a) may remain in place until the entire multi-layer lens structure shown in FIG. 6(a) is formed. Naturally, the invention is not limited to the two-layered lens structure shown in FIG. 6(a), rather any desired number of lens layers may be manufactured in the above manner.

Figure 6B:
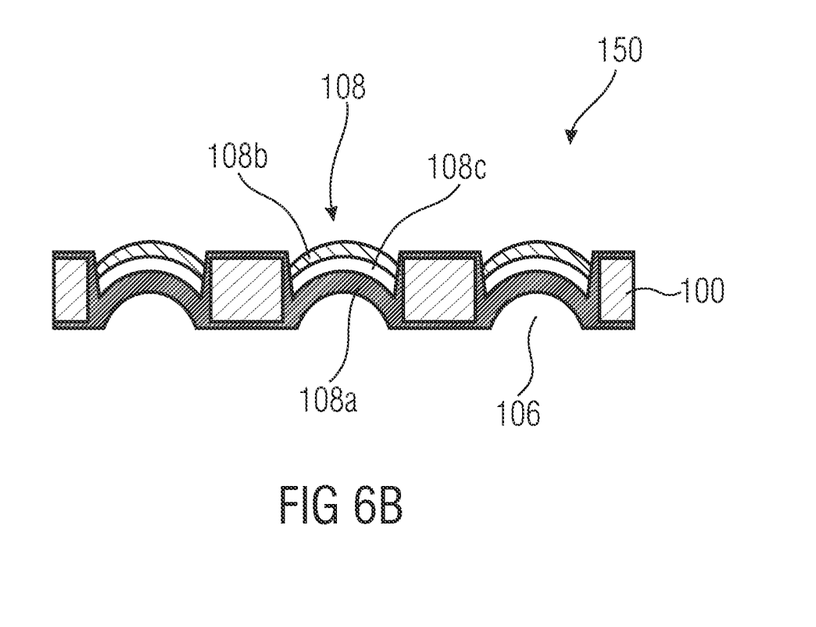

FIG. 6(b) shows a further, alternative lens array 150 being similar to the one of FIG. 6(a), except that between the first layer 108a and the second layer 108(b) of the lens structure 108 an air-filled or otherwise filled gap 108c is provided. This lens configuration is advantageous when more lens surfaces are desired to provide more degrees of freedom for the optical design in order to achieve good image quality.

Manufacturing the structure of FIG. 6(b) again starts from the structure shown in FIG. 4(b). Onto this structure a sacrificial material is applied, which is then shaped into a desired surface by means of an appropriate top stamp or mold. To this sacrificial material in a similar manner as described above with regard to FIG. 6(a) the material of the second layer 108b is applied and following curing the polymer materials the sacrificial material is removed, thereby yielding the space 108c between the upper and lower lens portion 108a and 108b. An additional cavity may be necessitated to allow removal of the sacrificial material, i.e. to allow access of the solvent and drain of the solved sacrificial material.

Although it was described above that the additional layer(s) is/are applied to the upper surface of the existing layer, it is noted that the additional layer(s) may as well be applied to the lower surface of the existing layer.

Figure 7A:
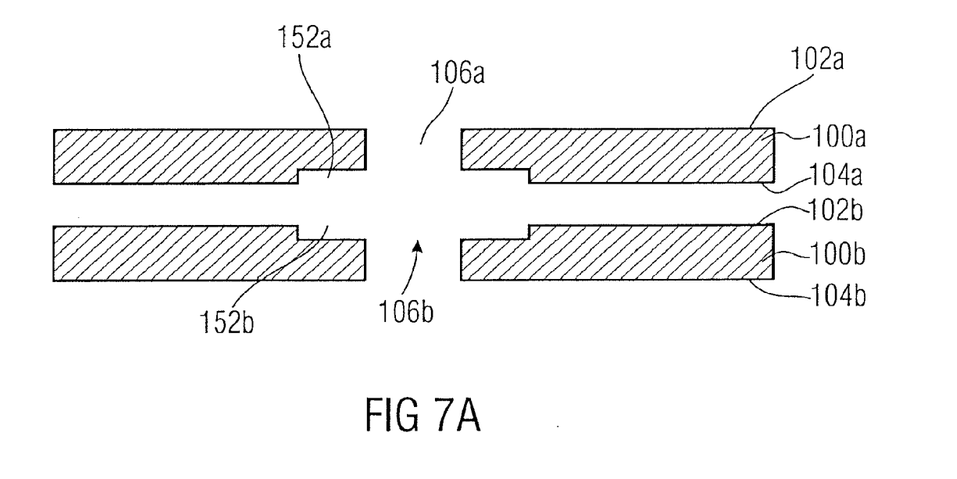
FIGS. 7(a)-(c) show a substrate having a groove for receiving an excess lens material which was displaced from the spacer cavity during shaping the lens structure.
Figure 7B:
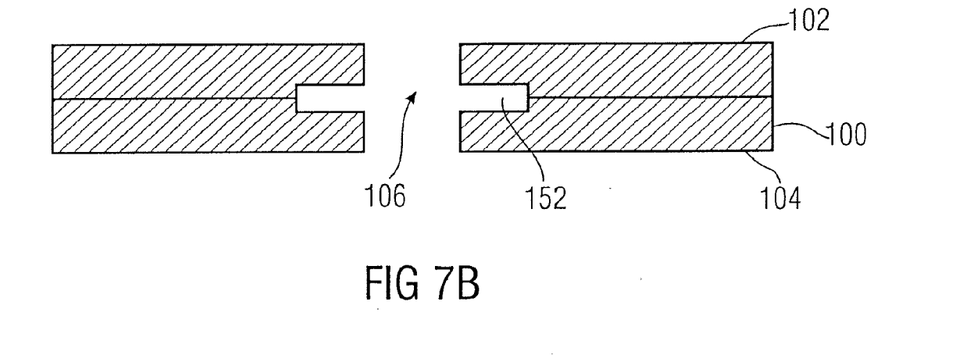

FIG. 7 shows an alternative implementation of a substrate used in accordance with the above described process for manufacturing a lens or a lens array. As can be seen from FIG. 7(a) the substrate is manufactured by providing two separate substrates 100a and 100b, each comprising upper and lower surfaces 102a, 102b and 104a and 104b. Each of the substrates comprises a through-hole 106a and 106b. In an area surrounding the through-hole 106a of the first substrate 100a in its lower surface 104a a recess 152a extending from the surface 104a into the substrate 100a is provided in a manner as shown in FIG. 7(a). The lower substrate 100b is also provided with a recess 152b surrounding the through-hole 106b, however, this time the recess 152b extends from the upper surface 102b of the substrate 100b into the substrate. The two substrates 100a and 100b are then bonded to each other such that the two recesses 106a and 106b are aligned yielding the structure of FIG. 7(b), namely a substrate 100 comprising the opposing main surfaces 102 and 104 in between which the recess 106 is arranged. As can be seen, by joining the two substrates 100a and 100b together a groove 152 surrounding the opening 106 is provided, i.e. a groove in the sidewalls of the hole 106.

Figure 7C:
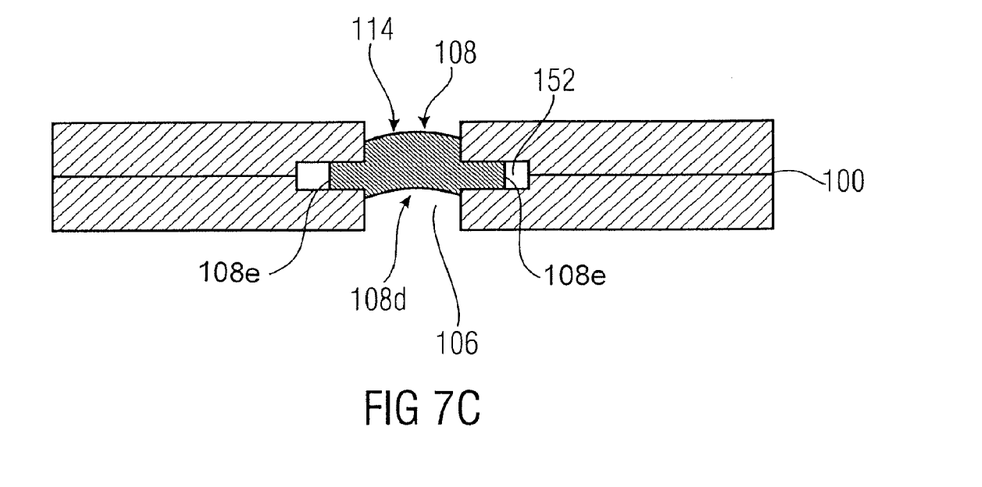

This groove receives the excess lens material which is displaced during the manufacturing steps described above so that a lens 114 having a structure as shown in FIG. 7(c) is obtained. As can be seen, within the recess or hole 106 of the substrate 100 the lens structure 108 is arranged. The lens structure 108 comprises the lens portion 108d arranged in the recess 106 and the portions 108e formed by material which was displaced into the groove 152. This approach may support fastening of the lens structure 108 to the substrate 100 and, at the same time, avoiding possibly undesired residual material on the upper and lower surfaces of the substrate 100. Mainly the groove 152 is for receiving the excess material. The groove may also be used for shrinkage compensation as allows that additional lens material can be introduced.

Figure 8A:
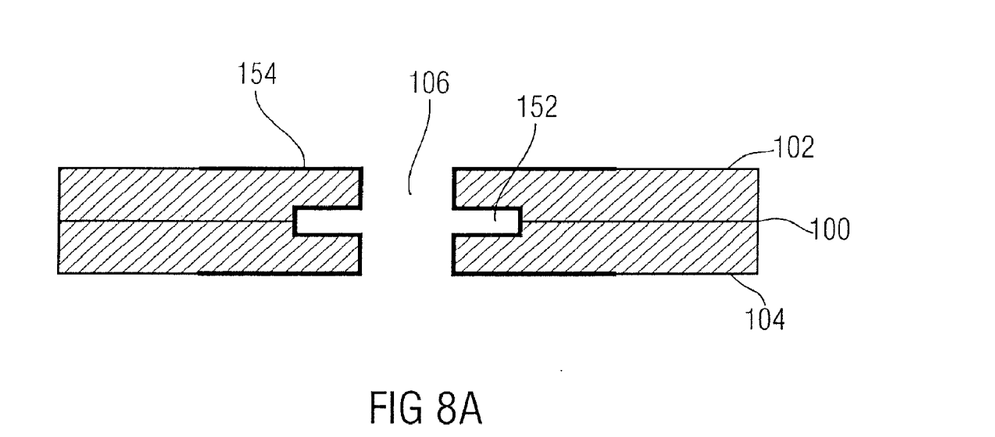
FIGS. 8(a)-(b) show an alternative realization of the substrate described with regard to FIG. 7.
Figure 8B:
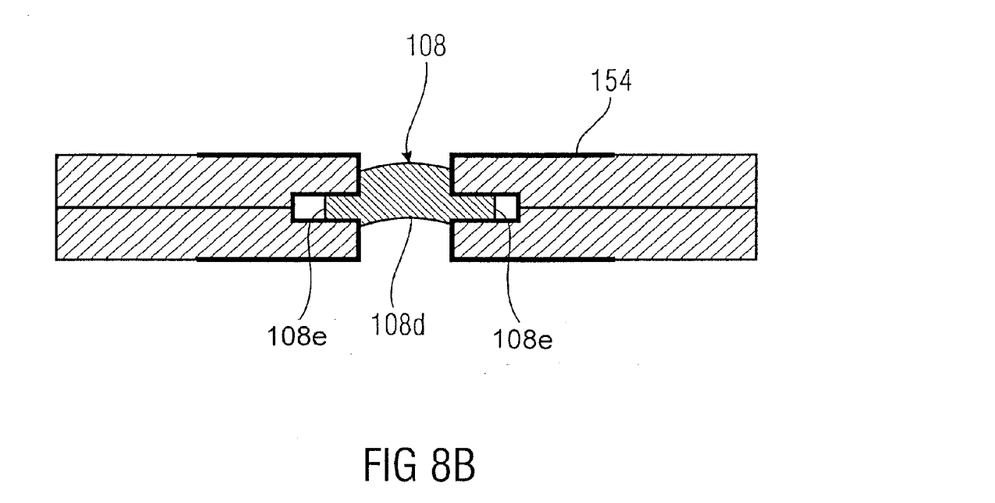

FIG. 8 illustrates an alternative embodiment of the substrate described with regard to FIG. 7. As can be seen from a comparison of FIGS. 7 and 8, the difference is that in accordance with FIG. 8 the upper and lower surfaces of the substrate 100 are partially covered by a layer 154 extending from the upper surface 102 of the substrate 100 along the sidewalls of the through-hole 106 and through the grooves 552 to the lower surface 104 of the substrate 100. The embodiment of FIG. 8 may be used in case the substrate 100 is transparent. The layer 104 may be formed by modifying the surface portions of the substrate, thereby blackening the respective surfaces or making same otherwise non-transparent, thereby suppressing false lights.

In the above embodiments described with regard to FIGS. 3 to 8 the lens structures were directly embossed into a lens material provided within a cavity of a spacer wafer. In the following, an alternative approach for manufacturing lenses or lens arrays without the (transparent) (glass-) carrier in the optical path is described which uses a transfer from a "normal" substrate to a spacer substrate. In accordance with this approach a sacrificial lens array is provided on a conventional substrate, for example by providing a photo-resist layer and shaping the surface thereof in accordance with a first (lower) desired lens surface of a later lens. On top of this sacrificial lens array the "actual" micro lens array is generated by applying the lens material and shaping a second side facing away from the sacrificial lens array in accordance with a second (upper) desired lens surface. This structure is then attached to a spacer wafer, e.g. by flip-chip bonding. The wafer has cavities such that the respective "permanent" lenses formed of the lens material are arranged laterally centered with respect to the cavities of the spacer wafer. The lenses may be attached to the spacer wafer such that same are inside or on top of the cavities. The sacrificial lens array is then removed, for example by dissolving the photo-resist and only the desired lens structure, for example a thin meniscus lens remains at the spacer wafer with the lens structure inside the wafer cavities.

FIG. 9 describes the process for manufacturing a lens array in accordance with the just mentioned embodiment. A temporary carrier in the form of a substrate 200 is provided (see FIG. 9(a)). The temporary carrier 200 comprises a first surface 202 and a second surface 204 opposed to the first surface. As is shown in FIG. 9(b) onto the first surface 202 of the temporary carrier 200 a sacrificial layer 206 is applied. The sacrificial layer 206 is, for example, a photo-resist layer. The sacrificial layer 206 is structured in such a way that a plurality of lens portions 208 for defining a "negative" first lens side are provided in a surface of the sacrificial layer 206 facing away (convex portions—naturally alternative embodiments may provide concave portions) from the surface 202 of the temporary carrier 200. The lens portions 208 are shaped such that a negative shape of one side of a lens is defined in accordance with a first desired lens surface. As can be seen from FIG. 9(b) the lens portions 208 are separated from each other with a gap 210 therebetween. Onto the structure shown in FIG. 9(b) a lens material 214 is applied and a surface of the lens material facing away from the temporary carrier is shaped in accordance with the second desired lens surface resulting in the structure shown in FIG. 9(c). As can be seen, by means of the sacrificial layer 206 and the respective portions 208 and 210 thereof a lower side of the lens array is structured such that the lens material 212 comprises a plurality of lens portions 212a and a plurality of intermediate portions 212b, forming in the final lens array a support portion of the lens array structure. The second or upper surface of the lens material 212 may be shaped by appropriate means to obtain the structure shown in FIG. 9(c). For example, after providing the lens material 212 onto the structure of FIG. 9(b) the appropriate upper mold or stamp similar to the ones described with regard to the above-mentioned embodiments may be used to replicate the desired shape of an upper surface of a lens material.

Figure 9A:
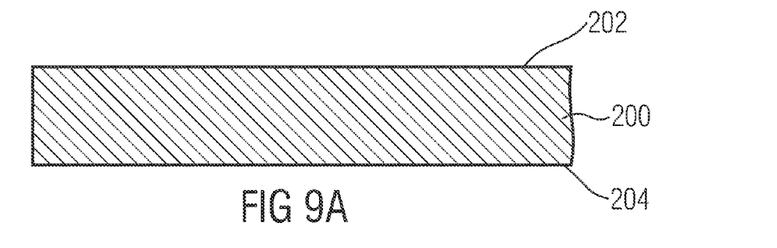
FIGS. 9(a)-(g) show the manufacturing of a lens array in accordance with a further embodiment of the invention.
Figure 9B:
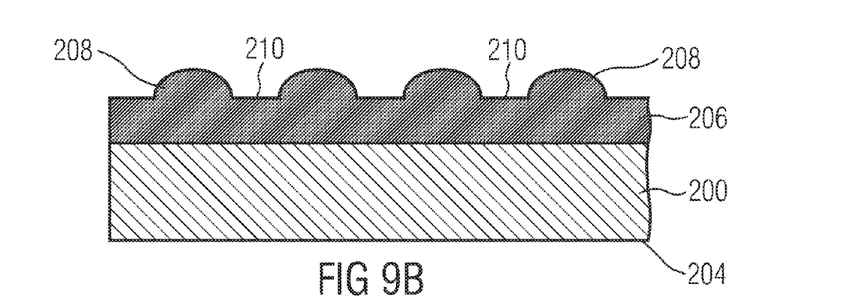
Figure 9C:
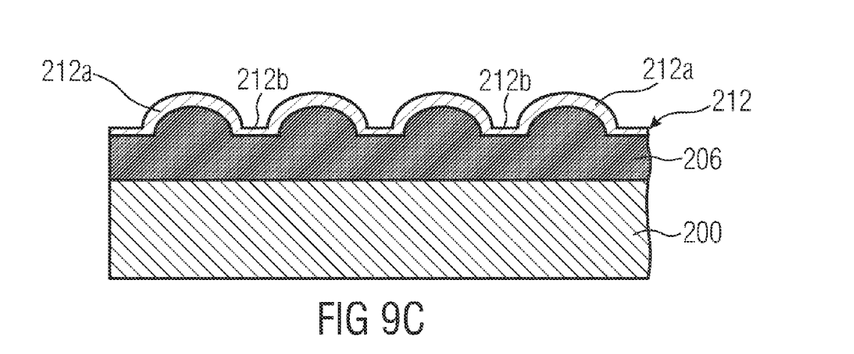
Figure 9D:
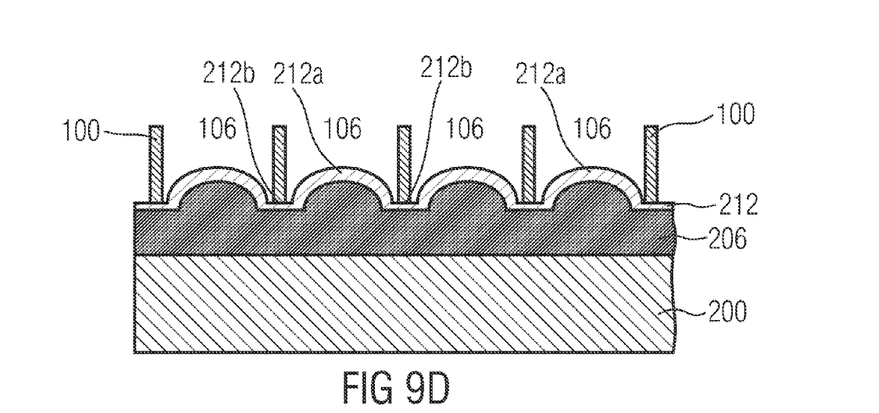

In a subsequent step, the structure shown in FIG. 9(c) is connected upside down to the wafer 100 comprising the plurality of recesses. More specifically, the structure of FIG. 9(c) is attached to a wafer at the support portions 212b inside the respective recesses as is shown in FIG. 9(d).

Figure 9E:
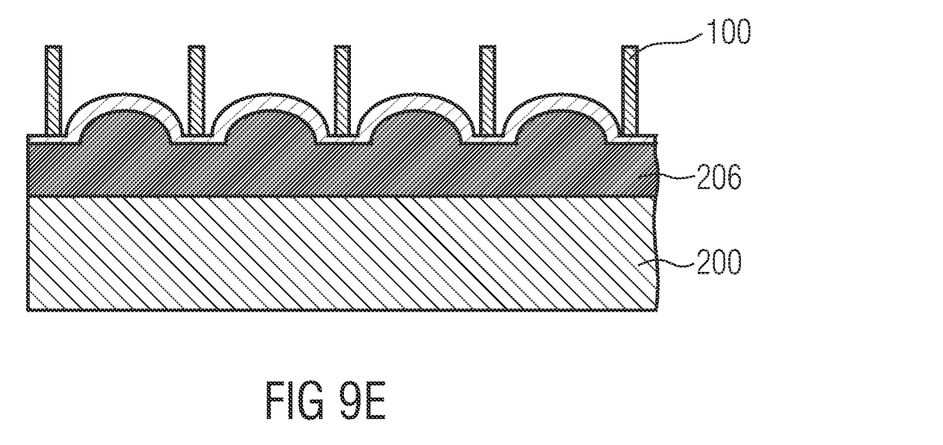
Figure 9F:
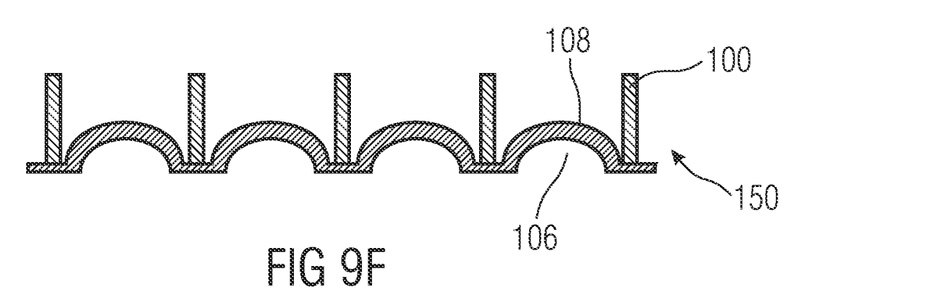

In a subsequent step shown in FIG. 9(e) the sacrificial layer 206 is dissolved, which, in turn, results in a separation of the lens structure from the temporary support 200 and finally yielding a structure as shown in FIG. 9(f), namely a lens array 150 comprising the respective lens structures 108 arranged within/attached to and laterally centered with the cavities 106 of the spacer wafer 100.

Figure 9G:
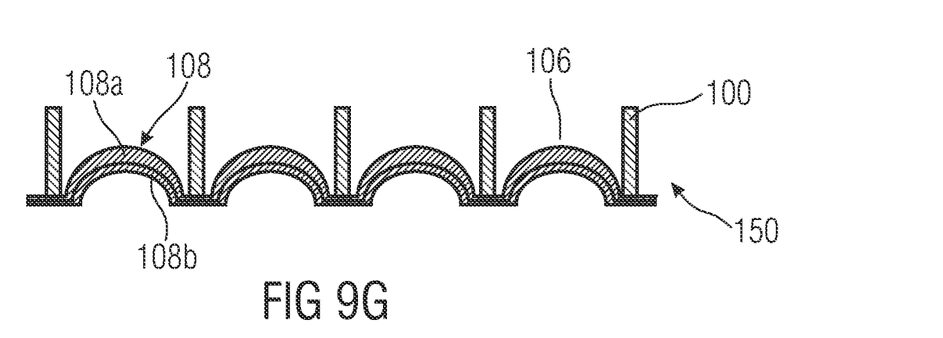

FIG. 9(g) illustrates an alternative design of the lens array, in accordance with which the lens structure 108 is a multi-layer structure comprising two lens material layers 108a and 108b in a manner as discussed above with regard to FIG. 6. The multi-layered lens structure 108 is obtained in a similar manner as described above, namely by providing multiple layers of lens material. To be more specific, starting from the structures shown in FIG. 9(c) an additional lens material layer either of the same material as the first layer or of a different material and either with the same thickness or with a different thickness is applied and the upper surface thereof is shaped. In a similar manner, a structure similar to the one shown in FIG. 6(b) may be obtained, namely by providing the two layers 108a and 108b with a space therebetween. In the same way as discussed above, starting from FIG. 9(c) a further spacer material or sacrificial material is applied to the first lens material 212 and then a further lens material is provided. After removing the further sacrificial material the two layers 108a and 108b are separated from each other in a manner similar to the one shown in FIG. 6(b).

In the embodiment of FIG. 9 the wafer 100 was described as comprising holes extending from the first surface thereof to its second surface. This embodiment is not limited to such a wafer, rather the structure shown in FIG. 9(b) might also be attached upside down to a wafer having a plurality of recesses only extending partly into the substrate, i.e. forming cup-like openings in one of the substrate surfaces. The substrate 100 may be pre-processed such that additional circuitry is provided in the lower part thereof. The circuitry may include photo sensitive areas or other sensitive areas which receive incident light beams or other electromagnetic beams which are coupled to the desired area of the circuitry by means of the lens structure. The processing of the circuitry 120 may be done through the recess. In an alternative embodiment the structure may be obtained by providing two substrates or wafers, an upper wafer including the recess extending through the entire thickness thereof and a lower substrate including the circuitry. The two substrates are then wafer bonded.

In the above described embodiments the molds were applied to the substrates which were already provided with respective lens material, at least in the cavities thereof. However, the invention is not limited to such embodiments.

Rather, in accordance with alternative embodiments the molds may be placed at a desired position with regard to the wafer prior to providing the lens material. Once the molds are applied in the correct relationship with regard to each other and with regard to the recesses or cavities of the wafer 100 through appropriate means like channels or the like inside the molds the material may be introduced into the cavities.

For the above described embodiments for manufacturing the inventive lens structures, the following materials are used (the following materials are only examples and the invention is not limited to such materials):

- as a lens material 112 generally any UV-curable or even any thermally curable polymer may be used, more specifically a organic-inorganic hybrid polymer, like Ormocomp and Ormocore by Microresist Technology, Exfine CO 150 . . . 160 by ChemOptics (acrylic basis); SU8; UV-glues like Zipcone UA by Gelest, Norland N61, N63, N68, Panacol/Elosol Vitralit-family (V1507, V9010), Dymax OPA-20632, Desotech 3471-2-136, Epo-Tek OG134
- as a sacrificial material 108 a water-soluble material like Dymax Gel, conventional photoresists (e.g. from Hoechst, acetone- or isopropanol-soluble); polyvenylalcohol (e.g. from TDI, water-soluble; or polystorol may be used
- as a support substrate 100 glass, ceramic, glass ceramic, metal, metal meshes, casted polymer materials, glues (SU8, Epotek), silicon, germanium, plastic, epoxy molding compounds, as e.g. used for (film assisted) resin transfer molding for packaging integrated circuits (e.g. grey-black with filling), form parts of a thermosetting material, elastomers or other transparent materials including pigments may be used,
- The glass may be a black structured glass (e.g. Foturan) or D263T from Schott, Borofloat;
- The polymer may be PMMA, Polycarbonate, Zeonex (COP); or Topas (COC).
- as stamp support layer 142 a glass (mask blank), silica/quartz, borofloat, D263T may be used;
- as patterned stamp layer 146 PDMS (polydimethylsiloxane), Fluorolink by Solvaysolexis may be used.

In the above described embodiments, the support substrate or wafer 100 was provided with the openings 106. The support wafer is advantageously non-transparent to the radiation to be received by the lens structure. The wafer might either be from an original non-transparent material or it might be a glass wafer which can be illuminated at desired portions to become non-transparent (e.g. Foturan).

In the embodiments described above, the side walls of the holes were perpendicular to the substrate surface. However, also other shaped side walls may be desirable, for example tilted side walls to obtain a cone-shaped opening. In the embodiments described in FIGS. 6 and 7 in addition to the openings 106 the wafer 100 may further be pre-processed to define pre-structured dicing cavities or grooves wherein the wafer is surrounded by a solid glass supporting ring without such dicing cavities.

In accordance with another embodiment of the invention, the substrate/wafer 100 is formed of a photosensitive glass (e.g. Foturan) which can be structured for a variety of purposes. This material combines the unique glass properties (transparency, hardness, chemical and thermal resistance, etc.) and the opportunity to achieve very fine structures with tight tolerances and high aspect ratio (hole depth/hole width). The glass is masked to determine a desired structure and is exposed to UV light, e.g. light between 290 nm and 330 nm. Atoms, e.g. silver atoms, in the glass are formed in the illuminated areas, and by a following heat treatment, e.g. between 500° C. and 600° C., the glass crystallizes around these atoms. The crystallized areas can be etched, e.g. with a 10% solution of hydrofluoric acid at room temperature, with an etching rate being up to 20 times higher than that of the non-treated areas. Using such a material for the substrate/wafer 100 is advantageous as the structuring of the glass support for the lens structure can be easily achieved.

Figure 10A:
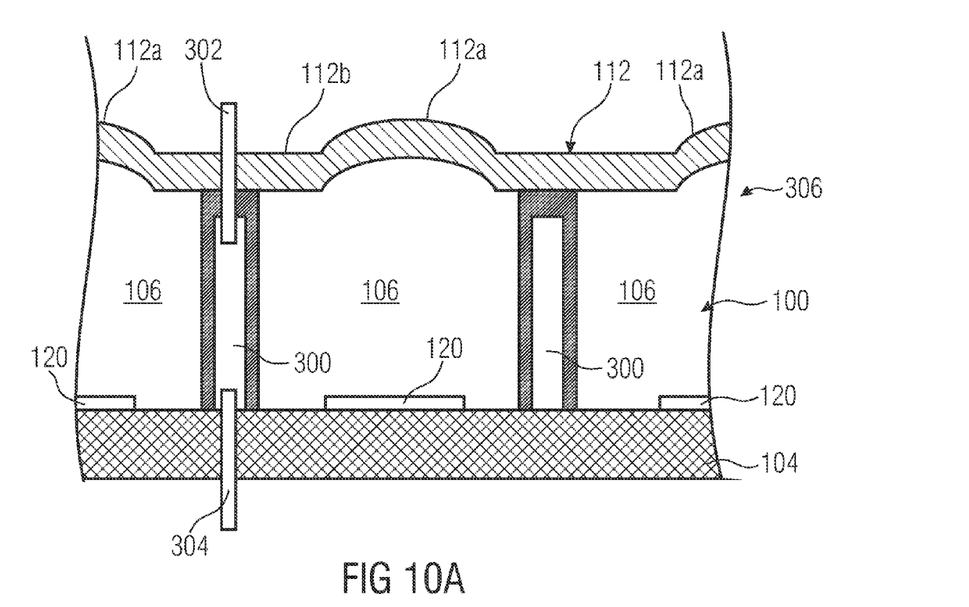
FIGS. 10(a)-(b) show an embodiment using a wafer of a photosensitive glass material for manufacturing lenses on a wafer scale.
Figure 10B:
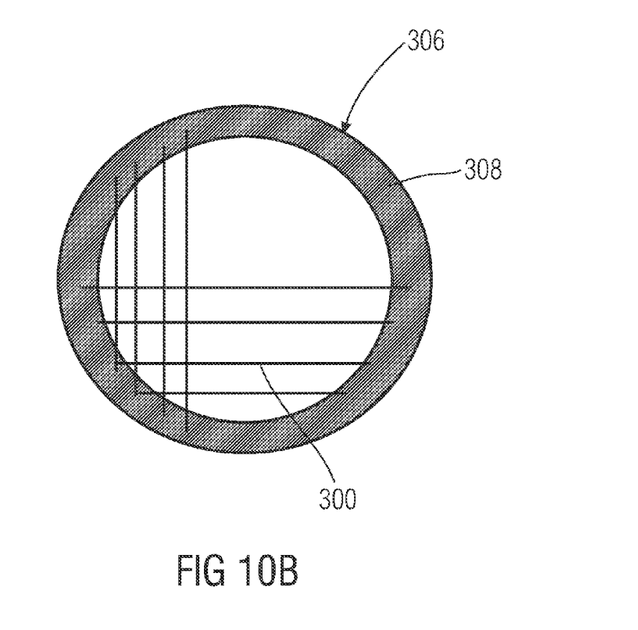

FIG. 10(a) and FIG. 10(b) show an embodiment using the above described material for manufacturing lenses on a wafer scale. FIG. 10(a) shows a cross-sectional view of a portion of the wafer 100 of FIG. 6(i). By masking, illuminating, heating and etching the wafer 100 was structured to define the recesses 106 and further the cavities (slits) 300 that extend into the wafer 100 from its lower surface (the surface opposite to the lens 112). To be more specific, in a first step, the wafer 100 is masked, illuminated, heated and etched to define the cavities 300, and in a second step, the wafer 100 is masked, illuminated, heated and etched to define the recesses 106 (or vice versa). In a third step, the entire remaining wafer 100 is illuminated with UV light thereby making the wafer non-transparent (black). This illumination is done with a dose that is lower than that used during illumination in the first and second steps. The dose is selected to make the glass non-transparent and to maintain the stability of the glass against the environment (to avoid unintended removal of material due to environmental influences).

The cavities or slits 300 are advantageous as same define "dicing streets" in the wafer 100. In FIG. 10(a) dicing blades 302 and 304 are schematically shown which are used to dice the wafer 100 to which the lens wafer 112 and the circuit wafer 104 are bonded. Only small amounts of the wafer material need to be removed for dicing the wafer structure 306 of FIG. 10(a), namely only the silicon of the circuit wafer 104 and the lens material of lens wafer 112 and a small amount of glass material of the wafer 100.

FIG. 10(b) shows a top view of the wafer structure 306 of FIG. 10(a). To maintain the stability of the wafer structure 306 not all regions of the wafer 100 are provided with the slits 300. Rather, a solid glass supporting ring 308 without dicing cavities 200 is provided.

While specific lenses where described above it is to be noted that the invention is not limited to the illustrated lenses. Rather, any desired lens may be generated by means of the inventive process as described above resulting in a "free-hanging" lens structure of desired shape above an opening or recess in a support layer. For example, the lens may be selected from the group comprising plano convex lenses, plano concave lenses, bi-convex lenses, bi-concave lenses and meniscus lenses, e.g. convex-concave and concave-convex menisci.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for manufacturing a lens, the method comprising:
   (a) providing a substrate comprising a recess in a first surface of the substrate; and (b) forming in or above the recess of the substrate a lens structure comprising a first desired lens surface and a second desired lens surface; wherein the recess extends from the first surface of the substrate to a second surface of the substrate to define a hole through the substrate;

step (b) comprises:

introducing into the recess a bottom mold having a shape corresponding to a first desired lens surface;

introducing a lens material into the recess of the substrate; and introducing a top mold having a shape corresponding to a second desired lens surface into the recess filled with the lens material; and curing the lens material filled in the recess; and a space arranged to receive excess lens material during shaping of the lens is provided to secure the lens structure in the recess.

2. The method of claim 1, wherein step (b) further comprises:

following the curing of the lens material, applying a further lens material onto at least one side of the shaped lens material; and introducing a further mold into the recess to shape the exposed side of the further lens material, the further mold having a shape corresponding to the desired shape of the exposed side of the lens material.

3. The method of claim 1, wherein step (b) further comprises:

following the shaping of the lens material, applying a sacrificial material onto at least one side of the shaped lens material;

applying a further lens material to the sacrificial material;

introducing a further mold into the recess to shape the exposed side of the further lens material, the further mold having a shape corresponding to the desired shape of the exposed side of the lens material; and removing the sacrificial material.

4. The method of claim 1, wherein the space arranged to receive the excess lens material during shaping of the lens includes:

a space between the first surface of the substrate and the top mold and a space between the second surface of the substrate and the bottom mold; or a groove formed in a sidewall of the recess.

5. The method of claim 1, wherein introducing the lens material into the recess comprises applying the lens material to the substrate or dispensing the lens material into the recess.

6. The method of claim 1, wherein the substrate is a wafer comprising a plurality of recesses, and wherein the top mold and the bottom mold each comprise a plurality of mold portions to be introduced into the plurality of recesses for defining a plurality of lens structures.

7. The method of claim 1, comprising:

forming an aperture structure for the lens on the substrate or on the lens material.

8. The method of claim 1, wherein step (b) comprises curing the lens material.

9. A lens manufactured according to the method of claim 1, comprising:

a substrate comprising a recess in a first surface thereof; and a lens structure arranged in the recess.

10. An optical system comprising one or more lenses manufactured according to the method of claim 1, the one or more lenses each comprising:

a substrate comprising a recess in a first surface thereof; and a lens structure arranged in the recess.

11. The optical system of claim 10, wherein dependent from a desired optical characteristic of the optical system, the lens and the substrate thickness of each of the plurality of lenses are selected, wherein the lenses are stacked.

12. A method for manufacturing a lens, the method comprising:

(a) providing a substrate comprising a recess in a first surface of the substrate; and (b) forming in or above the recess of the substrate a lens structure comprising a first desired lens surface and a second desired lens surface; wherein step (b) comprises:

providing a sacrificial material having a shape corresponding to a first desired lens surface;

applying the lens material to the sacrificial material to define the lens structure;

shaping a side of the lens material facing away from the sacrificial material in accordance with a second desired lens surface;

mounting a structure comprising the sacrificial material and the lens material to the substrate such that the lens structure is arranged in or above the recess; and removing the sacrificial material.

13. The method of claim 12, comprising prior to mounting the structure to the substrate applying a further lens material to the shaped lens material.

14. The method of claim 12, comprising prior to mounting the structure to the substrate:

applying a further sacrificial material to the lens material; and applying a further lens material to the further sacrificial material, wherein the method further comprises removing the further sacrificial material.

15. The method of claim 12, wherein the substrate is a wafer comprising a plurality of recesses; and providing the sacrificial material comprises providing a wafer comprising arranged thereon the sacrificial material which comprises a plurality of portions shaped in accordance with the first desired lens surface.

16. A lens manufactured according to the method of claim 12, comprising:

a substrate comprising a recess in a first surface thereof; and a lens structure arranged in the recess.

17. An optical system comprising one or more lenses manufactured according to the method of claim 12, the one or more lenses each comprising:

a substrate comprising a recess in a first surface thereof; and a lens structure arranged in the recess.

18. The optical system of claim 17, wherein dependent from a desired optical characteristic of the optical system, the lens and the substrate thickness of each of the plurality of lenses are selected, wherein the lenses are stacked.

\* \* \* \* \*